[19] United States Patent
Willson

[11] 4,363,785
[45] Dec. 14, 1982

[54] WOOD STOVE HAVING CATALYTIC CONVERTER

[76] Inventor: Allan C. Willson, 1355 Suntree Ct., Salem, Oreg. 97302

[21] Appl. No.: 277,120

[22] Filed: Jun. 25, 1981

[51] Int. Cl.³ .................. B01D 53/36; B01J 15/00; F24C 1/14; F24C 14/00
[52] U.S. Cl. ................... 422/173; 110/211; 110/214; 126/61; 126/77; 422/180; 422/187
[58] Field of Search ............. 422/173, 176, 177, 180, 422/187; 110/203, 211, 214; 126/60, 61, 77, 79, 58, 280

[56] References Cited
U.S. PATENT DOCUMENTS

| | | | |
|---|---|---|---|
| 2,845,882 | 8/1958 | Bratton | 110/203 |
| 2,993,454 | 7/1961 | Hebert | 110/211 |
| 4,131,104 | 12/1978 | Choate | 126/60 |
| 4,136,662 | 1/1979 | Willson | 126/61 |
| 4,196,713 | 4/1980 | Blankenship et al. | 126/60 |
| 4,220,625 | 9/1980 | Toh et al. | 422/180 |

Primary Examiner—Bradley Garris
Attorney, Agent, or Firm—Oliver D. Olson

[57] ABSTRACT

A wood burning stove is formed with double front and rear side walls of heat conductive metal spaced apart by heat conductive spacer fins and providing air passageways by which room air is heated by conduction from the walls which are heated by the burning of wood deposited on a firebox floor supported in heat conducting relationship with the inner side walls. A catalytic converter is disposed over the fire area in the upper portion of the stove, and is arranged to receive preheated fresh secondary air which mixes with hot, incompletely combusted compounds from the fire and, in the presence of the catalyst, induces a secondary combustion of the substances. This mixture is channeled into a heat extraction chamber where the secondary combustion is completed and the resultant heat is transferred to the metal body of the stove. An exhaust passageway is provided for releasing the products of complete combustion into the atmosphere.

11 Claims, 9 Drawing Figures

WOOD STOVE HAVING CATALYTIC CONVERTER

BACKGROUND OF THE INVENTION

This invention relates to wood burning stoves, and more particularly to a wood burning stove constructed with a catalytic converter assembly to provide maximum wood burning efficiency.

This invention is an improvement on my wood burning stove described in U.S. Pat. No. 4,136,662 in that it incorporates with my earlier stove a catalytic converter for improving the efficiency of operation and minimizing the expulsion of pollutants into the atmosphere.

Although catalytic converters are employed in wood burning stoves of the prior art, none of them are known to be arranged to introduce fresh secondary combustion air at the converter.

SUMMARY OF THE INVENTION

In its basic concept, this invention provides a wood burning stove which utilizes a catalytic converter in combination with added fresh air to provide secondary combustion of incompletely combusted substances released by the primary combustion in the firebox.

It is by virtue of the foregoing basic concept that the principal objective of this invention is achieved; namely, to maximize fuel combustion in a stove and thereby increase the usable heat obtainable from the fuel and minimize carbon monoxide and particulate pollution expelled into the surrounding environment.

Another object of this invention is to provide a stove of the class described which allows wood or other solid fuel to be burned slowly while maximizing the exhaust of products of complete combustion.

A further object of this invention is the provision of a stove of the class described which includes a heat conductive firebox floor construction which incorporates an air-regulating grate for controlling the volume of primary combustion air provided to the underside of the fire and for the simplified removal of accumulated ash resulting from the combustion of wood or coal.

A still further object of this invention is to provide a stove of the class described which is of simplified construction for economical manufacture, affords long service life with minimum maintenance and repair, and maximizes the output efficiency of the stove.

Another object of this invention is the provision of a stove of the class described in which the secondary air delivered to the catalytic converter is preheated sufficiently to prevent cooling of the gases and other products of combustion in the firebox.

The foregoing and other objects and advantages of this invention will appear from the following detailed description, taken in connection with the accompanying drawings of a preferred embodiment.

DESCRIPTION OF THE PREFERRED EMBODIMENT

Figure 1:
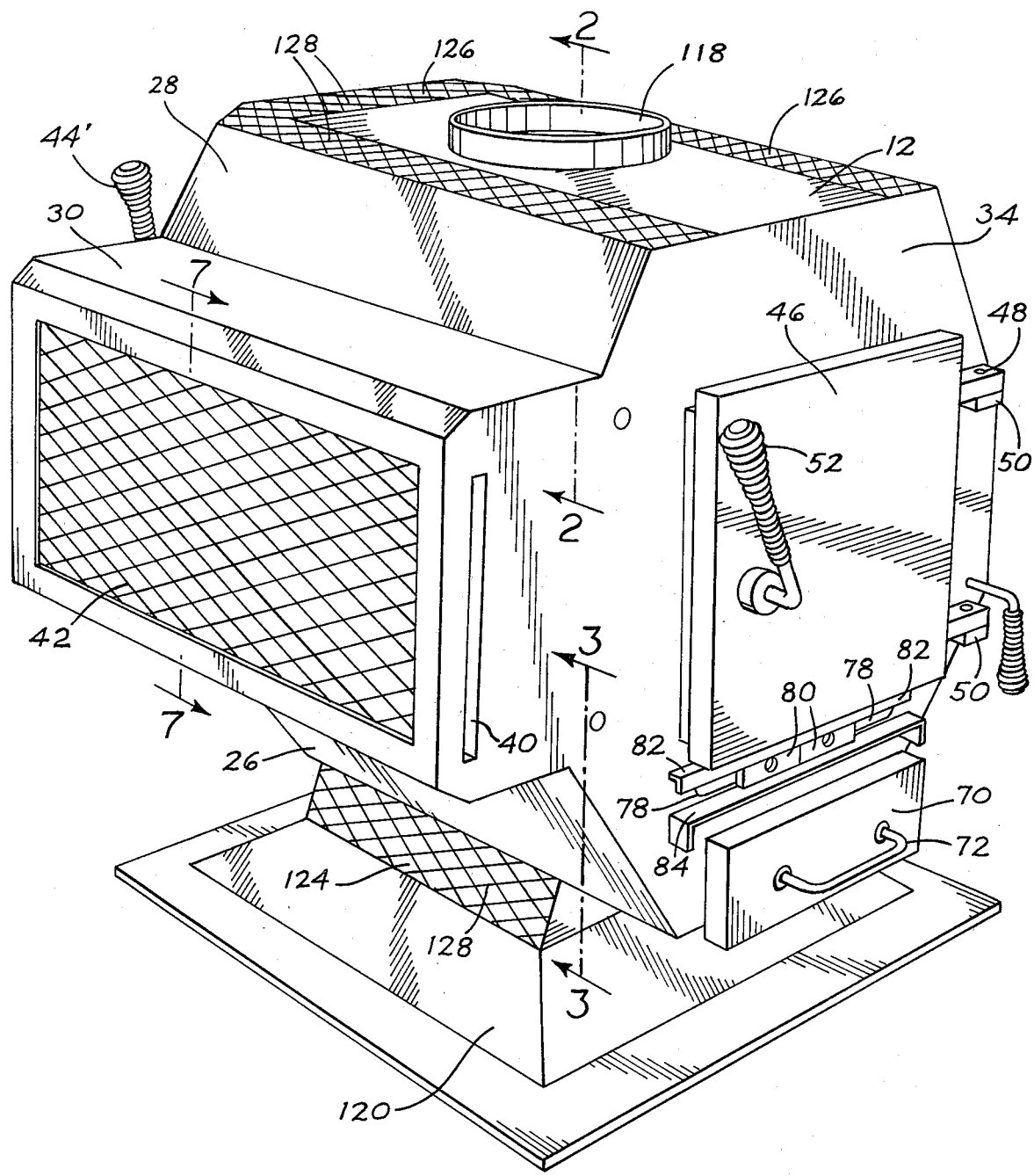
FIG. 1 is a perspective view of a wood burning stove embodying the features of this invention.

As illustrated in the drawings, the stove is provided with a bottom wall 10, a top wall 12 and double front and rear side walls, all of heat conductive metal. The double rear side wall includes an inner wall formed of a lower section 14 which extends angularly upward and outward from the bottom wall 10 and an upper section 16 which extends from the upper edge of the lower section angularly upward and inward to the top wall 12. The outer rear wall includes a lower section 18 parallel to the lower inner section 14, and an upper section 20 parallel to the upper inner section 16. The outer sections are secured to the inner sections by heat conductive fins (not shown) which space the inner and outer walls apart and provide passageways between them, as described more fully in my U.S. Pat. No. 4,136,662.

The double front side wall is formed of the lower inner wall section 22 which extends angularly upward and outward from the bottom wall 10, and the upper inner wall section 24 extending angularly downward and outward from the top wall 12, and the outer lower and upper wall sections 26 and 28, respectively, spaced outwardly from the corresponding inner wall sections by heat conductive fins (not shown) to provide passageways between them. Unlike the back wall, the sections 22, 24, 26, and 28 are spaced apart at their respective inner ends (FIG. 7), and said inner ends are closed by upper and lower inner and outer horizontal plates 30, 30' and 32, 32' all of which project forwardly beyond the outer front wall.

As fully described in U.S. Pat. No. 4,136,662, the front and rear ends of the stove are closed by front and rear end walls 34 and 36, respectively, which extend to the outer side wall sections and also form end closures for the upper and lower plates 30, 30' and 32, 32'. The plates 30 and 32 together with the end closure walls, form a rectangular viewing box. The outer end of the box is closed by a window 38 of heat resistant glass which is mounted removably in a channel 40 best described and illustrated in my earlier patent. The outer plates 30' and 32' are spaced from the inner plates to form air channels which communicate with the spaces between the inner and outer front side wall sections 22, 24, 26 and 28. The outer plates extend forwardly beyond the window and form an opening which, as illustrated, is fitted with a sheet of expanded metal 42. The expanded metal sheet serves to protect the glass from inadvertent breakage, as well as a decorative purpose.

The inner end of the rectangular viewing box is removably closed by means of a pair of hinged doors 44 (FIG. 7) which are operable by levers 44' (FIG. 1). Air passes through the viewing box through openings in the plates 30 and 32 adjacent both top and bottom sides of the glass, as per my earlier patent. The air wipes across the surfaces of the glass and thereby maintains the glass free of soot.

The front end wall 32 of the stove incorporates a firebox access door 46 for the introduction of wood or other solid fuel into the stove. The door is arranged to removably close an opening in the front end wall. The door is mounted pivotally on the front wall by means of a pair of pivot pins 48 mounted on brackets 50 projecting from the wall 34. The door incorporates conventional lock means (not shown) operable by rotating a door lock handle 52.

Figure 3:
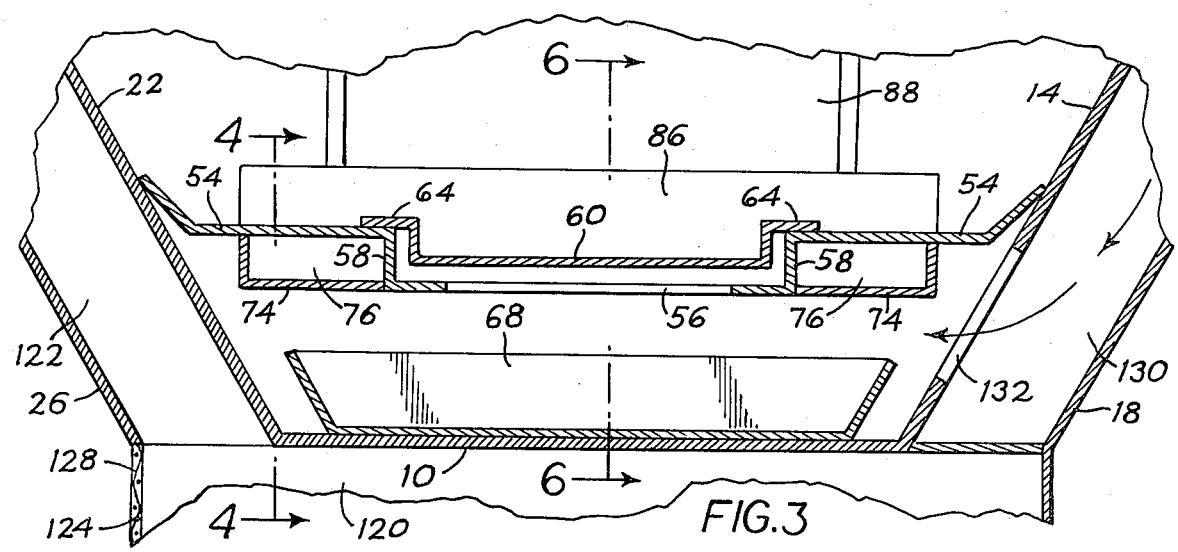
FIG. 3 is a fragmentary sectional view taken on the line 3—3 in FIG. 1.

In the preferred embodiment illustrated, and best shown in FIG. 3, a firebox floor 54 of heat conductive metal, preferably stainless steel, is arranged to be secured, as by welding, to the firebox side walls 14 and 22, a spaced distance above the bottom wall 10 of the stove. The centrally depressed area of the floor incorporates longitudinally spaced, laterally extending slots 56 positioned within a pair of laterally spaced guide walls 58 which define the central depressed area of the floor and serve to guide the reciprocation of a shaker grate.

The shaker grate includes a plate having a centrally depressed area 60 provided with longitudinally spaced slots 62 which cooperate with the slots 56 in the floor in the manner described more fully hereinafter. Side areas 64 of the plate are supported slidably on the raised side areas of the floor, whereby to support the central area 60 of the plate slightly above the floor, 54 for example about ¼ inch. The central area 60 is configured to be slightly narrower than the space provided between the walls 58 of the floor, whereby the walls 58 serve to guide the shaker plate as it is moved longitudinally. A hollow post 66 is provided near the front end of the shaker grate to receive the end of a poker or other tool for moving the grate. Thus, the grate may be used to vary the registration of the slots 56 and 62 to adjust the primary air to the firebox. It may also be used to move the grate back and forth longitudinally within the firebox over the slots 56 to shake collected ash through the slots and into an ash tray 68 located below the firebox floor, as shown in FIG. 3.

The ash tray 68 is supported freely on the bottom wall 10 of the stove and extends through an opening in the lower portion of the front end wall 34 of the stove below the door 46. The front end of the ash tray is formed in the shape of rectangular box 70 preferably constructed in the manner described in my earlier patent to provide an air-tight seal. In closed position, the tray terminates a spaced distance inward of the rear end wall 36 to allow ashes to accumulate while still enabling closing of the front end of the tray. A handle 72 is provided on the ash tray to assist in its removal from the stove.

FIG. 3 also illustrates a pair of L-shaped members 74 welded to the underside of the raised side areas of the firebox floor 54 to form therewith a pair of laterally spaced fresh air tubes 76. The tubes extend from opening 78 in the front end wall 34 to the rear end wall 36. Means for regulating the volume of air permitted into said tubes is provided by adjustment plates 80 which are supported slidably between brackets 82 and 84 and are adjustable to varying degrees of interception of the openings 78. Sliding the plates from their central, maximum open position illustrated in FIG. 1 laterally outward to a position in which the plates cover more of the openings, regulates the amount of room air allowed to pass through the openings and into the tubes 76.

Figure 2:
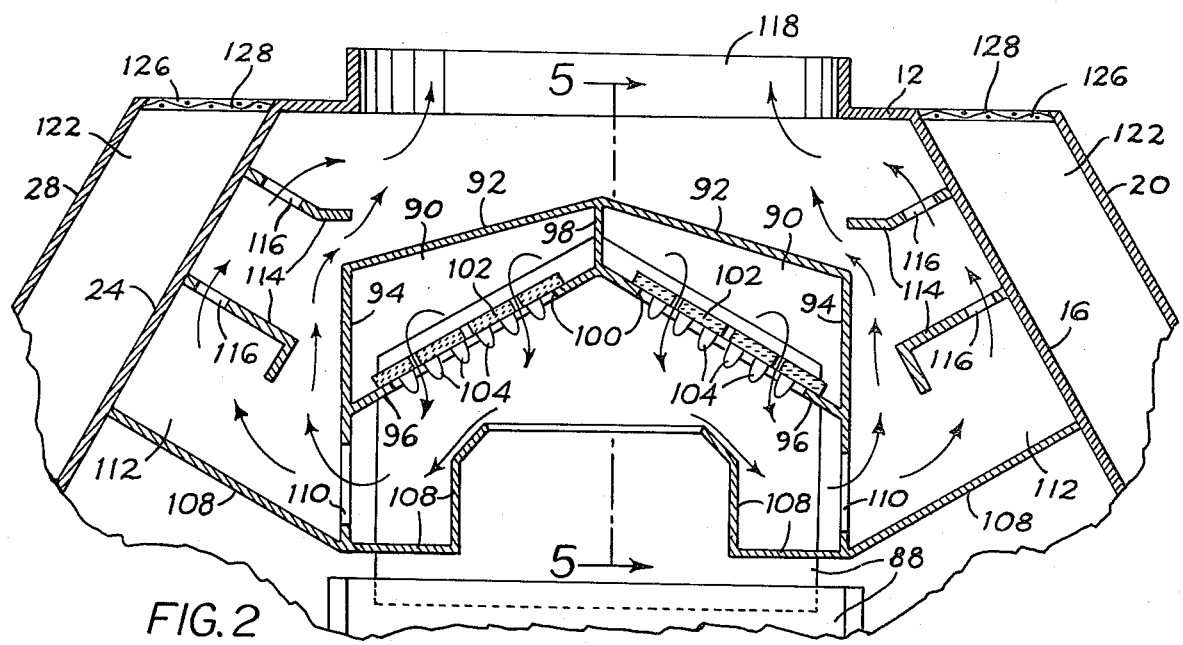
FIG. 2 is a fragmentary sectional view taken on the line 2—2 in FIG. 1.
Figure 4:
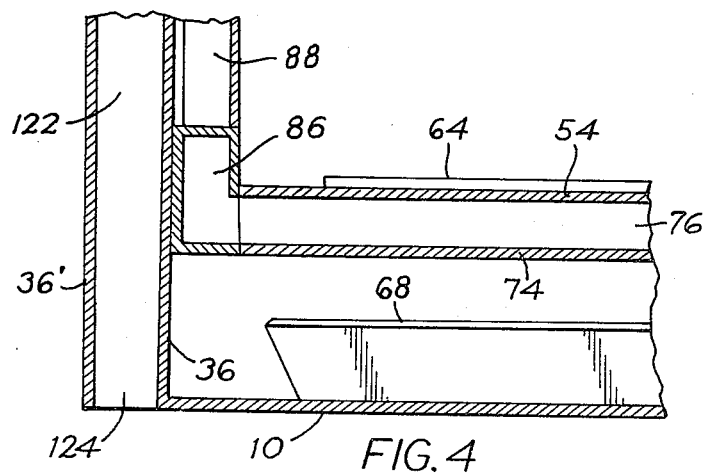
FIG. 4 is a fragmentary sectional view taken on the line 4—4 in FIG. 3.
Figure 5:
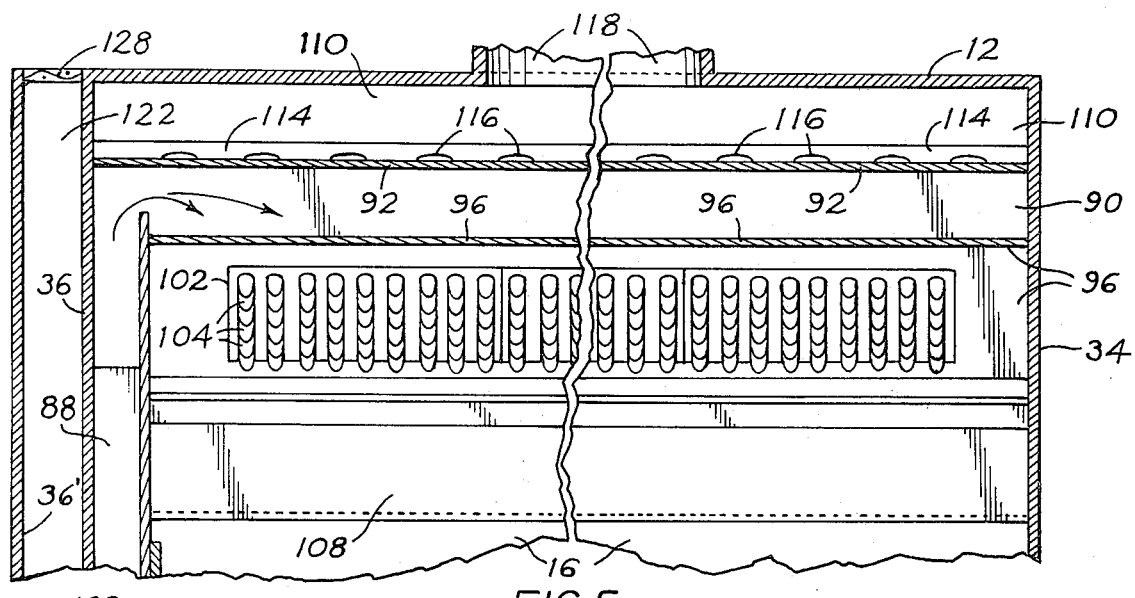
FIG. 5 is a foreshortened, fragmentary sectional view taken on the line 5—5 in FIG. 2.
Figure 6:
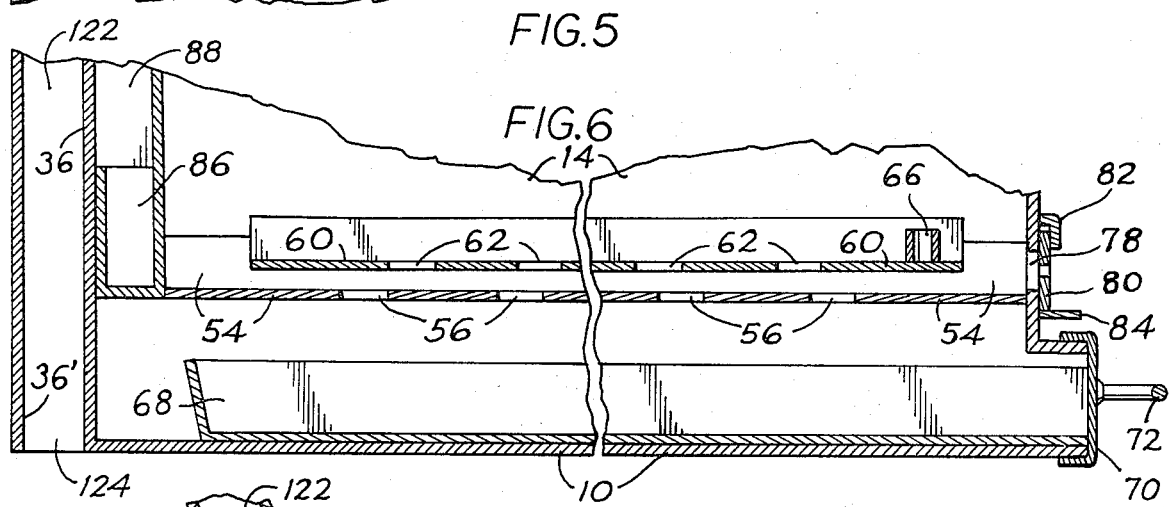
FIG. 6 is a foreshortened, fragmentary sectional view taken on the line 6—6 in FIG. 3.

FIGS. 3, 4 and 6 show the tubes 76 connected at the rear end wall 36 to a header 86 which directs the air from the pair of tubes into a single air tube 88. This tube is formed by the rear end wall and a C-shaped member. It extends vertically upward along the rear wall and terminates, as shown in FIGS. 2 and 5, in a pair of air chambers 90. These chambers are defined by top walls 92, side walls 94, bottom walls 96 and divider wall 98. The front and rear walls 34 and 36 of the stove close the respective front and rear ends of the chambers. The fresh air thus is preheated by the fire in the firebox by transfer of heat from the firebox floor 54, members 74, header 86, air tube 88 and inner walls of the stove. As best shown in FIG. 5, bottom walls 96 are preferably configured as plates incorporating openings 100 through the central portion of each plate.

Catalytic converter means is provided above the firebox to maximize the combustion of fuel. In the embodiment illustrated herein, ceramic plates 102, one side surface coated with a catalytic material such as platinum and/or palladium, are supported by the bottom walls 96 of the chambers and arranged thereon to overlie and close the openings 100 through the walls.

Figure 7:
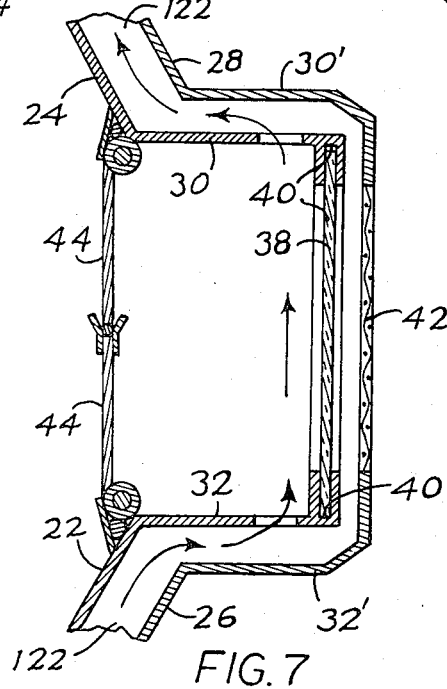
FIG. 7 is a fragmentary sectional view of the viewing window taken on the line 7—7 in FIG. 1.
Figure 8:
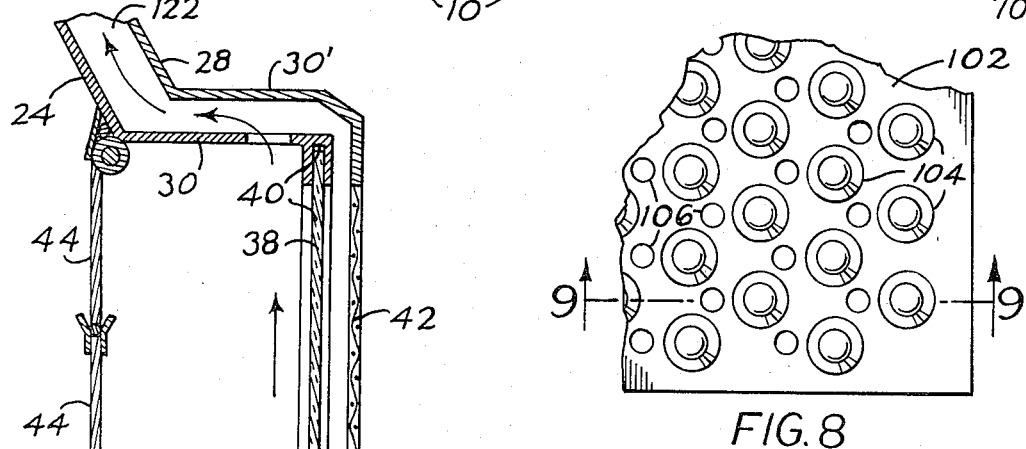
FIG. 8 is a fragmentary plan view of a catalytic converter plate of FIG. 2 showing the arrangement of the nodes and bores.
Figure 9:
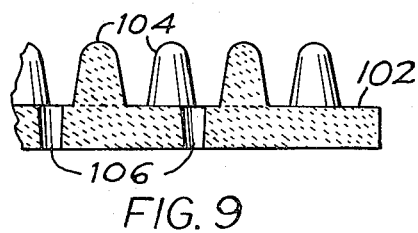
FIG. 9 is a fragmentary sectional view of the plate of FIG. 8, taken on the line 9—9 in FIG. 8.

FIGS. 7 and 8 show in detail the configuration of the ceramic plates. Each plate incorporates on the lower, catalyst coated surface, a multiplicity of outwardly projecting nodes 104. Each plate also incorporates a multiplicity of holes 106 adjacent the nodes. These holes are provided to permit the passage of preheated fresh air from the associated air chamber 90 onto the downwardly facing, catalyst coated surface of the plate where the fresh air mixes with the hot gases and incompletely combusted compounds given off by the fire in the firebox. In the presence of the catalyst, the oxygen furnished by the fresh secondary combustion air functions to induce a secondary combustion of the incompletely combusted compound.

The ceramic plates form a substrate for the catalytic material, and may be replaced with metal or other suitable substrate material, as desired. In the case of metal plates, the nodes and holes may be provided by conventional stamping techniques. The nodes may be omitted, if desired.

As shown in FIG. 2, the upper portion of the firebox is provided with panels 108 which extend inwardly from the side walls 16 and 24 and are arranged to channel the combustion gases and other products given off by a fire onto the surfaces of the catalytic plates. It will be noted in the preferred embodiment that side walls 94 of the air chambers 90 extend downward to the panels 108. Openings 110 through the side walls are provided to permit passage of the air and gases to the upper portion of the stove after having wiped across the catalytic plates.

This upper portion of the stove forms the heat extraction chamber 112 where heat from the hot combustion gases is transferred to the upper portions of the metal walls of the stove. The heat extraction chamber is defined by inner walls 16 and 24, top wall 12, front and rear walls 34 and 36, and by panels 108. Baffles 114 incorporating openings 116 are mounted within the extraction chamber to the side walls 16 and 24 for increasing retention time of the hot gases of combustion against the heat conductive metal surfaces of the chamber.

A passageway 118 in the top wall 12 is arranged to communicate a stove pipe with the extraction chamber for the release of the spent gases of combustion into the atmosphere.

As illustrated, the stove includes a pedestal base 120 to support the stove above the floor.

As previously mentioned, the preferred embodiment illustrated provides the double walled construction of my earlier patent whereby air passageways 122 are arranged between the inner and outer front and rear side walls in order that room air may enter the passageways through lower openings 124 (FIGS. 1 and 3) and be heated by contact with the hot metal walls and fins and exit the passageways through upper openings 126 into the surrounding atmosphere as heated room air. The back wall 36 also preferably is provided with a cooperating, outer wall 36' for the same purpose, also in the manner of my earlier patent. The visible upper and lower openings of these passageways preferably are covered by decorative expanded metal plates 128.

Although the air tubes 76 are shown herein as being mounted to the underside of the floor 54, it is to be understood that any means by which secondary combustion air is delivered by tubes in heat conducting relationship to the fire, is anticipated. For example, the tubes may be disposed on the upper surface of the floor, or they may replace the floor entirely, and thus also provide the additional function of supporting the fuel during burning. Alternatively, secondary air may be introduced directly to the air chamber 90, as through the back wall 36, if preheating is not required.

Any suitable arrangement may be made for providing the fire with sufficient primary air for combustion. The embodiment illustrated incorporates the features of my earlier mentioned stove wherein room air is introduced into the areas above and below the floor 54 through a central passageway 130 between the lower double rear walls 14 and 18. This passageway communicates with an opening in the outer lower wall 18 regulated by a thermostatically controlled damper. The metered air is directed to the areas above and below the firebox floor by openings in the lower inner wall. The illustrated opening 132 (FIG. 3) directs the air to the area below the floor.

The grate assembly also may be adjusted so that the slots 62 are in varying degrees of alignment with the slots 56 incorporated through the floor. In this manner, oxygen admitted to the lower portion of the fire may be regulated manually to control the intensity of the fire. The space between the centrally depressed areas 54 and 60 allows primary air to enter the firebox even when the slots 56 are fully covered by plates 60.

The spacing of slots 56 and 62 is such that only one shear edge at a time is encountered by glowing embers during movement of the plate 60. This minimizes the stress of shaking ashes from the floor 54 to the ash tray 68.

With a wood fire burning in the firebox, the operation of the stove is as follows: Since it is an objective of this invention to utilize the fuel available to its most efficient potential, a rather slow-burning fire is preferable. This is achieved by limiting the air available to the fire, as by adjusting the grate 60 to reduce the opening provided between the fire and the primary air filled area below the floor.

Reducing the amount of oxygen for combustion slows the burn rate of the fire. However, limiting the oxygen to the fire also results in incomplete combustion of the gases and hydrocarbons which are exhausted into the environment. In the stove of this invention, these incompletely combusted compounds rise with the air and are directed so as to "wipe" across the surface of ceramic plates 102 which are coated with catalytic material.

Secondary room air is introduced through openings 78 into air tubes 76 which are in heat-conducting relationship with the floor 54 of the firebox, thence through header 86 and vertical tube 88 which directs this preheated air upwards into the air chamber 90 which extends the length of the firebox over the fire. The air contained in the chamber then passes through the holes 106 in the catalytic converter plates 102 to the opposite, catalyst-coated surface, where the air mixes with the unburned gases and other compounds, and, in the presence of the catalyst, reacts to effect substantially complete combustion of those compounds. The volume and temperature of air admitted to the catalytic surface may be controlled by the adjustable slides 80 on the front end wall 34 of the stove. Reducing the volume of secondary air, for a small fire in the firebox, provides hotter air at the catalytic converter.

After passing over the plates 102 and mixing with the secondary air in the presence of the catalyst, the resultant hot gases of combustion follow the path of least resistance through openings 110 and 116 into heat extracting chamber 112. This secondary combustion is completed in this chamber, and the resulting very hot gases contact the surface of walls 12, 16 and 24, and transfer heat to the same. The cooled air, carbon dioxide and water vapor then exhaust out the passageway 118 into the environment, substantially pollution free.

The burning of wood or other solid fuel within the firebox creates an amount of inorganic ash. These particles gravitate downward through the grate openings 62 and floor slots 56 into the ash tray 68. A tool, such as a poker, may be inserted into the hollow post 66 to move the grate 60 back and forth in order to shake this ash through the slots and into the ash tray, when desired.

In a typical operation of the stove, the burning of wood on the floor 54 produces a temperature of about 600° F. to about 800° F. at the catalytic converter, with secondary air in chambers 90 being at least about 500° F. The temperature in the heat extraction chamber 112 ranges from about 800° F. to about 1300° F. The effectiveness of heat extraction from this chamber to the walls of the stove is evidenced by the temperature drop to around 450° F. about two feet into a stove pipe coupled to the exhaust passageway 118.

It will be apparent to those skilled in the art that various changes, other than those previously mentioned, may be made in the size, shape, type, number and arrangement of parts described hereinbefore without departing from the spirit of this invention and the scope of the appended claims.

Having thus described by invention and the manner in which it may be used, I claim:

1. A stove for burning solid fuel, comprising:
  (a) top, bottom, front, rear and side walls,
  (b) a fuel-supporting floor above the bottom wall,
  (c) means for providing primary combustion air into the interior of the stove adjacent the fuel-supporting floor,
  (d) catalytic converter means supported a spaced distance above the fuel-supporting floor, the converter means having a catalyst coated surface arranged to intercept incomplete combustion products from a fire on the fuel-supporting floor, (e) means for introducing secondary combustion air to said catalyst coated surface for mixing with said combustion products, comprising an enclosed air chamber supported a spaced distance above the fuel-supporting floor, said catalyst coated surface forming at least a portion of an outside wall of said air chamber, (f) a heat extraction chamber including the side and top walls of the stove arranged to receive the hot combustion gases passing from the catalytic converter and to transfer the heat from said gases to the side and top walls of the stove, and (g) a combustion gas exhaust passageway means for communicating the heat extraction chamber with the atmosphere.

2. The stove of claim 1 wherein said fuel-supporting floor incorporates openings therethrough, and a shaker grate overlying said floor for reciprocation relative thereto, the shaker grate incorporating openings arranged for alignment with said floor openings.

3. The stove of claim 2 including an ash tray supported removably on the bottom wall and underlying the openings in said floor.

4. The stove of claim 1 wherein said catalytic converter means comprises at least one substrate plate having a multiplicity of holes therethrough from the coated surface to the opposite side surface, and the secondary air is introduced to said opposite surface for passage through said holes to the catalyst coated surface.

5. The stove of claim 4 including a multiplicity of outwardly projecting nodes on the catalyst coated surface side of the substrate plate.

6. The stove of claim 1 wherein the means for introducing secondary air includes secondary air passageway means in the stove arranged to be in heat conductive relationship with hot gases of combustion in the stove for pre-heating said secondary air.

7. The stove of claim 6 wherein the secondary air passageway means is arranged to introduce pre-heated secondary air substantially immediately adjacent said catalyst coated surface.

8. A stove for burning solid fuel, comprising:
(a) top, bottom, front, rear and side walls,
(b) a fuel-supporting floor above the bottom wall,
(c) means for providing primary combustion air into the interior of the stove adjacent the fuel-supporting floor,
(d) catalytic converter means supported a spaced distance above the fuel-supporting floor, the converter means having a catalyst coated surface arranged to intercept incomplete combustion products from a fire on the fuel-supporting floor, the converter means comprising at least one substrate plate having a multiplicity of holes therethrough from the coated surface to the opposite side surface,
(e) means for introducing outside air to said opposite surface for passage through said holes to the catalyst coated surface for mixing with said combustion products, said means comprising:
  (1) an enclosed air chamber supported a spaced distance above the fuel-supporting floor, said substrate plate forming at least a portion of the bottom side of the air chamber with said opposite side surface exposed to the interior of the chamber, and
  (2) means connected to the air chamber for admitting outside air thereto,
(f) a heat extraction chamber including the side and top walls of the stove arranged to receive the hot combustion gases passing from the catalytic converter, and
(g) a combustion gas exhaust passageway means for communicating the heat extraction chamber with the atmosphere.

9. The stove of claim 8 wherein the air chamber is in heat conductive relationship with the heat extraction chamber.

10. The stove of claim 9 including an air tube arranged in heat conducting relationship with the interior of the stove for receiving heat from a fire in the stove, the air tube communicating said air chamber with the atmosphere outside the stove.

11. The stove of claim 10 including adjustment means associated with the air tube for selectively controlling the volume of air allowed to pass through the tube to the air chamber.

* * * * *